United States Patent
Kong et al.

(10) Patent No.: US 12,150,011 B2
(45) Date of Patent: Nov. 19, 2024

(54) METHOD FOR V2X SERVICE AND DEVICE USING SAME

(71) Applicant: LG ELECTRONICS INC., Seoul (KR)

(72) Inventors: Kwangsik Kong, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 424 days.

(21) Appl. No.: 17/776,898

(22) PCT Filed: Jun. 30, 2020

(86) PCT No.: PCT/KR2020/008514
§ 371 (c)(1),
(2) Date: May 13, 2022

(87) PCT Pub. No.: WO2022/004907
PCT Pub. Date: Jan. 6, 2022

(65) Prior Publication Data
US 2022/0408219 A1 Dec. 22, 2022

(51) Int. Cl.
*H04W 4/029* (2018.01)
*H04W 4/02* (2018.01)
(Continued)

(52) U.S. Cl.
CPC .......... *H04W 4/029* (2018.02); *H04W 4/023* (2013.01); *H04W 4/40* (2018.02); *H04W 4/50* (2018.02);
(Continued)

(58) Field of Classification Search
None
See application file for complete search history.

(56) References Cited

U.S. PATENT DOCUMENTS 10,560,948 B2   2/2020   Mok et al.
2013/0293394 A1  11/2013   Rubin et al.
(Continued)

FOREIGN PATENT DOCUMENTS

CN   109874123 A   6/2019
CN   110166977 A   8/2019
(Continued)

OTHER PUBLICATIONS

Huawei et al. "Update to network QoS and situation monitoring aligned with SA2", S6-191473, 3GPP TSG-SA WG6 Meeting #32. Roma, Italy, Jul. 8-12, 2019. 6 pages.
(Continued)

*Primary Examiner* — Frantz Bataille
(74) *Attorney, Agent, or Firm* — Birch, Stewart, Kolasch & Birch, LLP

(57) ABSTRACT

A server for vehicle-to-everything (V2X) service can receive, from a first V2X device, a message for configuring a subscription area of the first V2X device; receive, from a second V2X device, a second V2X message including a vehicle-to-everything identifier (V2X ID) identifying the second V2X device and movement information of the second V2X device including at least one of speed information and position information of the second V2X device; and in response to determining that the second V2X device affects the first V2X device and the second V2X device is located outside of the subscription area of the first V2X device, transmitting a reconfiguration message to the first V2X device for adjusting the subscription area of the first V2X device.

19 Claims, 9 Drawing Sheets

(51) Int. Cl.
*H04W 4/40* (2018.01)
*H04W 4/50* (2018.01)
*H04W 64/00* (2009.01)
*H04W 88/18* (2009.01)

(52) U.S. Cl.
CPC .......... *H04W 64/006* (2013.01); *H04W 88/18* (2013.01)

(56) References Cited

U.S. PATENT DOCUMENTS

| | | |
|---|---|---|
| 2016/0050269 A1 | 2/2016 | Botticelli |
| 2018/0192268 A1 | 7/2018 | Xu et al. |
| 2018/0242190 A1 | 8/2018 | Khoryaev et al. |
| 2019/0028862 A1* | 1/2019 | Futaki ................ H04W 4/44 |
| 2019/0053008 A1* | 2/2019 | He ...................... H04W 4/40 |
| 2019/0173951 A1 | 6/2019 | Sumcad et al. |
| 2020/0100048 A1 | 3/2020 | Wu et al. |
| 2020/0178048 A1 | 6/2020 | Kim et al. |

FOREIGN PATENT DOCUMENTS

| | | |
|---|---|---|
| EP | 3 273 708 A1 | 1/2018 |
| KR | 10-2017-0130428 A | 11/2017 |
| KR | 10-2018-0044992 A | 5/2018 |
| KR | 10-2090498 B1 | 3/2020 |
| WO | WO 2020/068329 A1 | 4/2020 |
| WO | WO 2020/104405 A1 | 5/2020 |

OTHER PUBLICATIONS

"Intelligent Transport Systems; Framework for public mobile networks in cooperative ITS (C-ITS)", Draft ETSI TR 102 926; No. V0.0.2, Oct. 19, 2011, XP14073120, pp. 1-79.
Extended European Search Report for European Application No. 20943802.7, dated Mar. 4, 2024.

* cited by examiner

FIG. 1
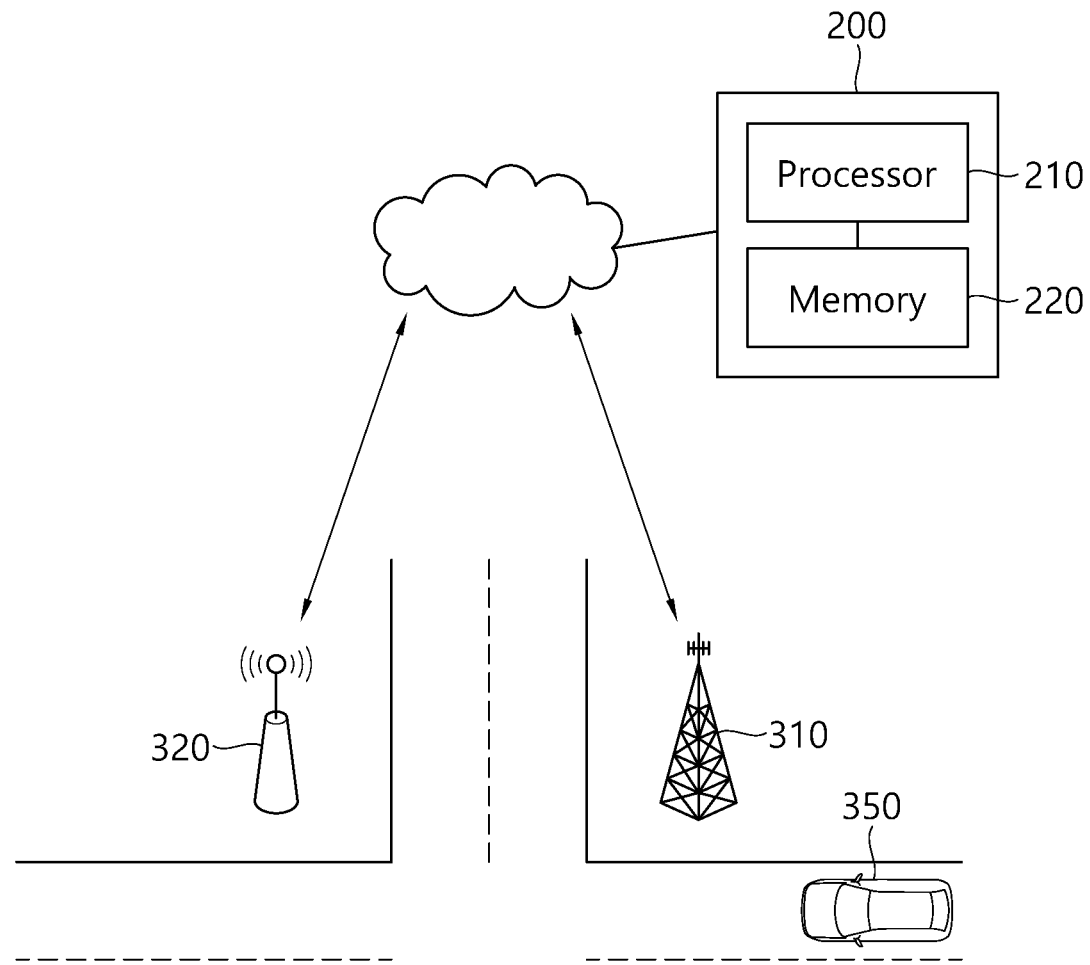
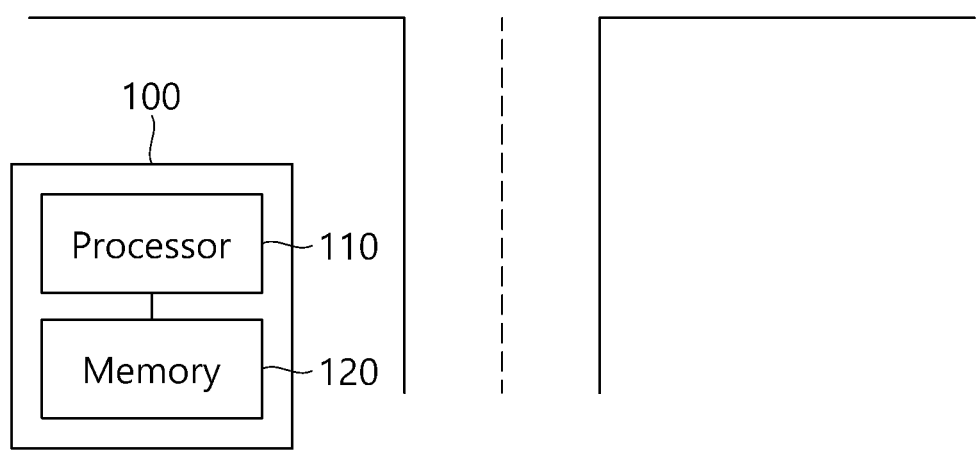

FIG. 3
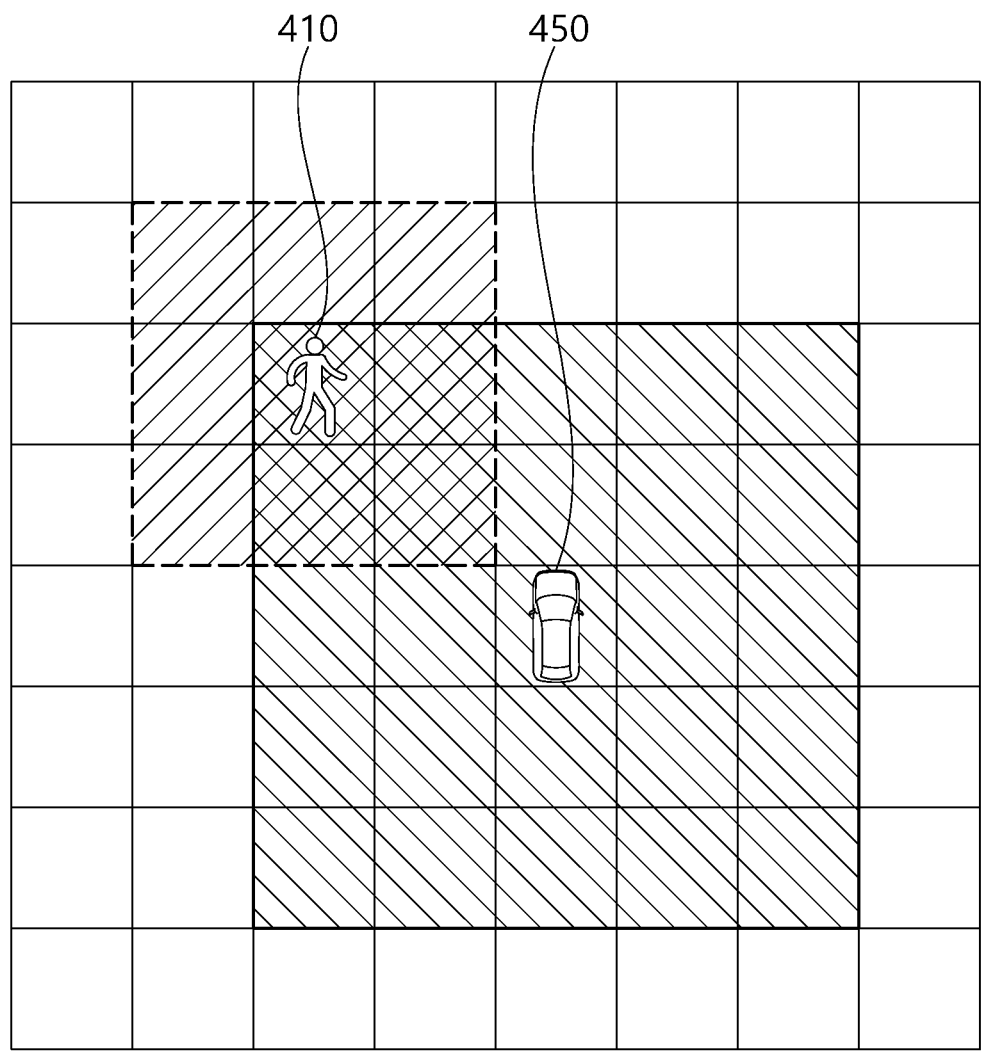
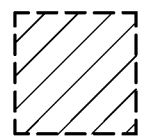 : First Subscription Area
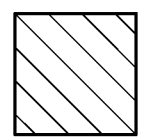 : Second Subscription Area

METHOD FOR V2X SERVICE AND DEVICE USING SAME

CROSS REFERENCE TO RELATED APPLICATIONS

This application is the National Stage filing under 35 U.S.C. 371 of International Application No. PCT/KR2020/008514, filed on Jun. 30, 2020, the contents of this application are hereby incorporated by reference herein in its entirety.

BACKGROUND OF THE DISCLOSURE

Field

The present disclosure relates to a method for vehicle-to-everything (V2X) service and a device using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides relates to a method for vehicle-to-everything (V2X) and a device using the same.

In an aspect, a server for vehicle-to-everything (V2X) service includes a processor, and a memory operatively coupled with the processor and configured to store instructions that, when executed by the processor, cause the RSU to perform functions. The functions includes receiving, from a first V2X device, a message for configuring a subscription area, receiving, from a second V2X device, a V2X message, the V2X message including a V2X ID identifying the second V2X device and driving information of the second V2X device, determining whether the second V2X device affects the first V2X device based on the V2X message if the second V2X device is not associated with the subscription area, and transmitting, to the first device, a reconfiguration message for requesting a reconfiguration of the subscription area of the first V2X device when the second V2X device affects the first V2X device.

In another aspect, a method for vehicle-to-everything (V2X) service includes receiving, from a first V2X device, a message for configuring a subscription area, receiving, from a second V2X device, a V2X message, the V2X message including a V2X ID identifying the second V2X device and driving information of the second V2X device, determining whether the second V2X device affects the first V2X device based on the V2X message if the second V2X device is not associated with the subscription area, and transmitting, to the first device, a reconfiguration message for requesting a reconfiguration of the subscription area of the first V2X device when the second V2X device affects the first V2X device.

In still another aspect, a device for vehicle-to-everything (V2X) service includes a processor, and a memory operatively coupled with the processor and configured to store instructions that, when executed by the processor, cause the RSU to perform functions. The functions includes transmitting, to a V2X server, a message for configuring a subscription area, receiving, from the V2X sever, a reconfiguration message for requesting a reconfiguration of the subscription area, and reconfiguring the subscription area based on the reconfiguration message.

It is possible to provide V2X services to more diverse users and devices, as well as vehicles.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 1 shows a system to which an embodiment of the present specification is applied.

FIG. 3 shows an example in which a subscription area is set according to an embodiment of the present specification.

DETAILED DESCRIPTION OF THE EMBODIMENTS

Figure 2:
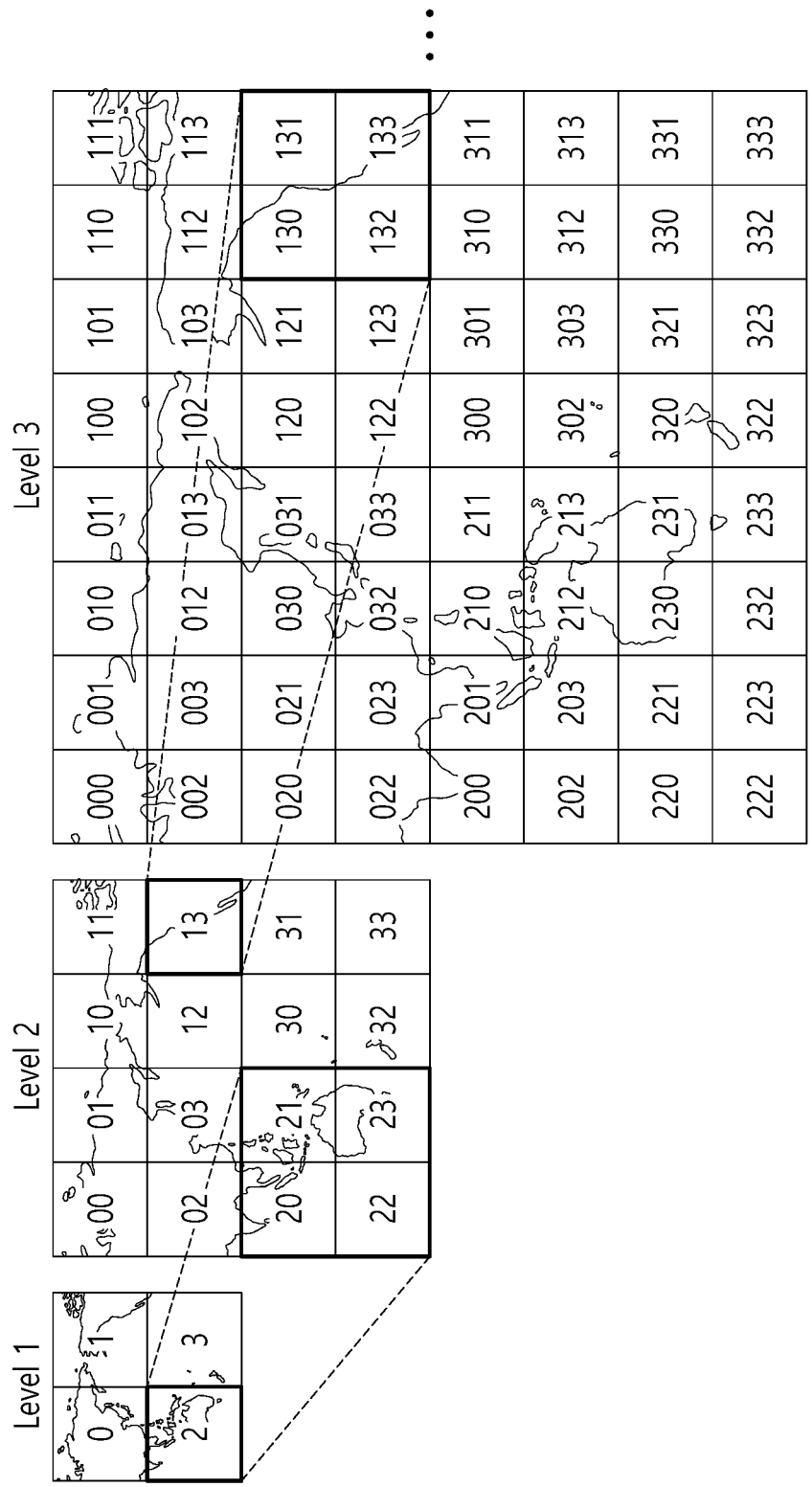
FIG. 2 shows an example of a tile using a quadtree according to an embodiment of the present specification.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it can be directly connected or coupled to the other element, but other elements can exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles can include automobiles, ships, aircraft, trains, motorcycles, bicycles, and the like. The vehicle can include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device can be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device can be mounted on a vehicle or electronic device as an on-board unit (OBU) to provide V2X functions and services to the vehicle. A V2X device disposed inside or outside the vehicle can be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 can communicate with the V2X server 200 through the base station 310 or a Road Side Unit (RSU) 320. The V2X device 100 can communicate with the base station 310, the RSU 320, a neighbor vehicle 350 and/or a neighbor V2X device using a wireless communication protocol. There is no limitation on the wireless communication protocol. The wireless communication protocol can include Dedicated Short Range Communications (DSRC), Cellular-V2X (C-V2X), WiFi, BLUETOOTH and/or cellular communication protocols based on 3rd Generation Partnership Project (3GPP) (e.g., Wideband Code Division Multiple Access (WCDMA), Long Term Evolution (LTE), New Radio (NR), etc.).

The V2X server 200 receives one or more V2X messages from the V2X device 100 within a managed area. The V2X server 200 can forward the one or more collected V2X messages to the subscribing V2X device 100.

The V2X message can periodically or aperiodically be transmitted to the V2X server 200 by the V2X device 100 (or RSU 320), and is a message providing status information of the V2X device 100 (or device managed by the RSU 320). For example, the V2X device 100 can transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements can be added/changed/deleted according to policies or circumstances.

TABLE 1

| Name | Description |
| --- | --- |
| V2X ID | A temporary identifier (ID) for identifying the V2X device sending this message. It is randomly selected by the V2X device and can be changed periodically. The size can be 4 octets. |
| Position | Indicates the location of the V2X device. Can contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. can include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 can include a processor 110 and a memory 120. The processor 110 implements the functions of the V2X device 100 and can include one or more software modules. The V2X device 100 can further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 can be a Mobile/Multi-access Edge Computing (MEC)-based server or a centralized-based server. The V2X server 200 can be called another name, such as a Geocast server or a SoftV2X server. The V2X server 200 can include a processor 210 and a memory 220. The processor 210 implements the function of the V2X server 200, and can include one or more software modules.

The processors 110 and 210 can include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein can be stored in the memories 120 and 220 and executed by the processors 110 and 210.

Memories 120 and 220 can store information accessible by processors 110 and 210. The information can include instructions executable by the processors 110 and 210 and/or data processed by the processor. Memories 120 and 220 can include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols can be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

FIG. 2 shows an example of a tile using a quadtree.

The quadtree represents a partition of space in two dimensions by decomposing a map (i.e., world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID can have the number of bits corresponding to the level. For example, each internal node in the quadtree can have four children.

The V2X device can acquire the ID of the tile in which the V2X device is located based on location information of the V2X device (e.g., latitude and longitude). The V2X device and/or the V2X server can adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area can be referred to as another name, such as a concerned area, an impact area, or a geocast area. The subscription area contains one or more tiles. The subscription area can be included in one management area, and can be defined across a plurality of management areas managed by a plurality of V2X servers.

Publishing area: The area where the V2X device publishes V2X messages to the V2X server. The publishing area can include one tile in each level. The publishing area can indicate a tile where the V2X device is currently located. Some or all of the publishing area can overlap with the subscription area.

FIG. 3 shows an example in which a subscription area is set.

A first subscription area is set to the first V2X device 410 (e.g., the leftward sloping hashing around the person associated with first V2X device 410), and a second subscription area is set to the second V2X device 450 (e.g., the rightward sloping hashing around the vehicle associated with/corresponding to second V2X device 450). Each V2X device can set/change/delete the subscription area periodically or aperiodically (e.g., when its location is changed). Each V2X device can request setting/change/deletion of the subscription area to the V2X server.

In this example, number of tiles included in the first subscription area is 9 and the number of tiles included in the second subscription area is 25, but the number of tiles included in the subscription area or the shape of the subscription area is not limited thereto. The subscription area can include a tile in which the V2X device is located. Alternatively, the subscription area can include one or more tiles other than a tile in which the V2X device is located.

The first V2X device 410 can generate a first V2X message and periodically send the first V2X message to the V2X server. The second V2X device 450 can generate a second V2X message and periodically send the second V2X message to the V2X server.

The V2X server can forward one or more V2X messages received in or around a subscription area to the V2X device related to the subscription area.

A device that sets a subscription area can be referred to as a "subscriber device." A device that transmits a V2X message to a V2X server can be referred to as a "provider device." A V2X device can be a subscriber device, a provider device, or both a subscriber device and a provider device. The V2X server can forward the V2X messages transmitted by the provider devices in the management area to the subscriber device.

The V2X server can deliver the V2X message of a provider device "associated" with the subscription area of a subscriber device to the subscriber device. A provider device associated with a subscription area of a subscriber device can be referred to as a "subscribed provider device." The provider device associated with the subscription area of the subscriber device can satisfy at least one of the following conditions (i) to (iii): (i) Part or all of the publishing area of the provider device overlaps the subscription area of the subscriber device; (ii) some or all of the subscription area of the provider device overlaps with the subscription area of the subscriber device; and/or (iii) the location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server can forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410 (e.g., the person is in the vehicle's subscription area so the vehicle can receive V2X messages from the person, but the vehicle is not in the person's subscription area just yet so the person not receive V2X messages from the vehicle, according to some situations or configurations). In other words, different areas or zones can be set for the first V2X device 410 and second V2X device 450, so that the second V2X device 450 is aware of the first V2X device 410, but the first V2X device 410 not be aware of second V2X device 450, since the first V2X device 410 has a much smaller subscription area. The second V2X device 450 is not a provider device of the first V2X device 410. However, if condition (ii) is considered, the second V2X device 450 can be a provider device of the first V2X device 410 (e.g., even if conditions (i) and (iii) are not met, the server can be configured to still deliver a message from the second V2X device to the first V2X device when condition (ii) is met).

Figure 4:
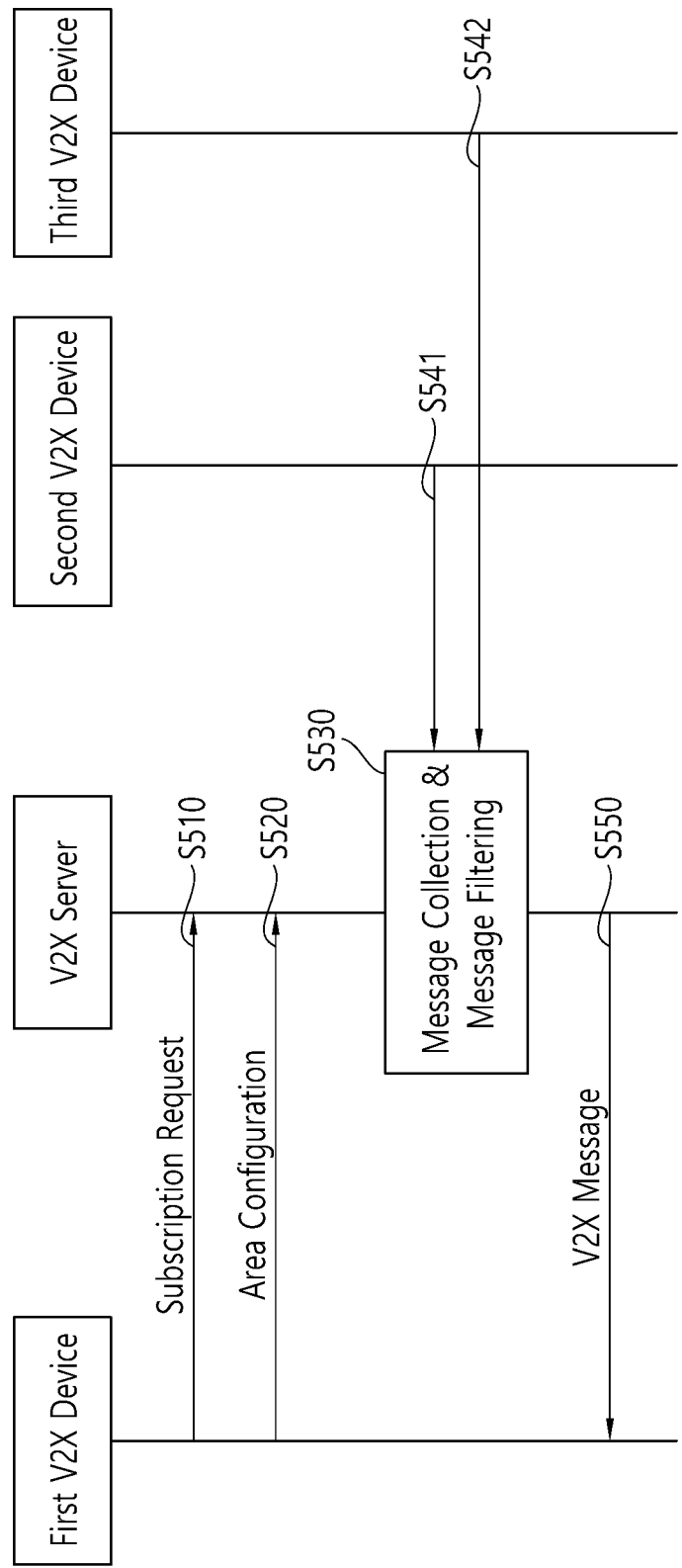
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request can include information about the identifier, location, etc. of the V2X device. The V2X server can transmit a subscription response for granting or rejecting subscription to the V2X device in response to the subscription request.

In step S520, the V2X device can send the area configuration related to the V2X service to the V2X server. The area configuration can be included in a separate message or included in the subscription request. The area configuration includes information about configuration and/or modification of the subscription area.

In step S530, the V2X server can collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages can be published separately or as a single message.

Message filtering is that V2X server filters the V2X messages to be transmitted to V2X devices that have completed the subscription request. Message filtering can be referred to as a process of selecting a subscribed provider device associated with a subscriber device among a plurality of provider devices. Filtering conditions can be defined differently depending on the subscription area and/or the state of the V2X device. For example, if the number of V2X devices in the subscription area is large, the filtering conditions can be modified so that more messages are filtered out. Filtering condition can be related to the degree of risk of the V2X device.

Now, how to modify a subscription area will be described.

As described above, in order for a V2X device to receive a V2X message from a V2X server, a subscription area is configured and registered with the V2X server. The V2X device can configure the size and/or shape of the subscription area based on driving information or movement information of the V2X device (e.g., speed/location/heading, etc.). For example, when driving or moving at high speed, the V2X device can configure a wider or larger subscription area, than compared to low-speed driving.

Outside the subscription area, a neighbor V2X device can come closer to a V2X device at high speed. Before the neighbor V2X device enters the subscription area, the V2X device may not receive the message of the surrounding V2X device, there may be a delay in awareness and the V2X may be unprepared for the upcoming risk.

Figure 5:
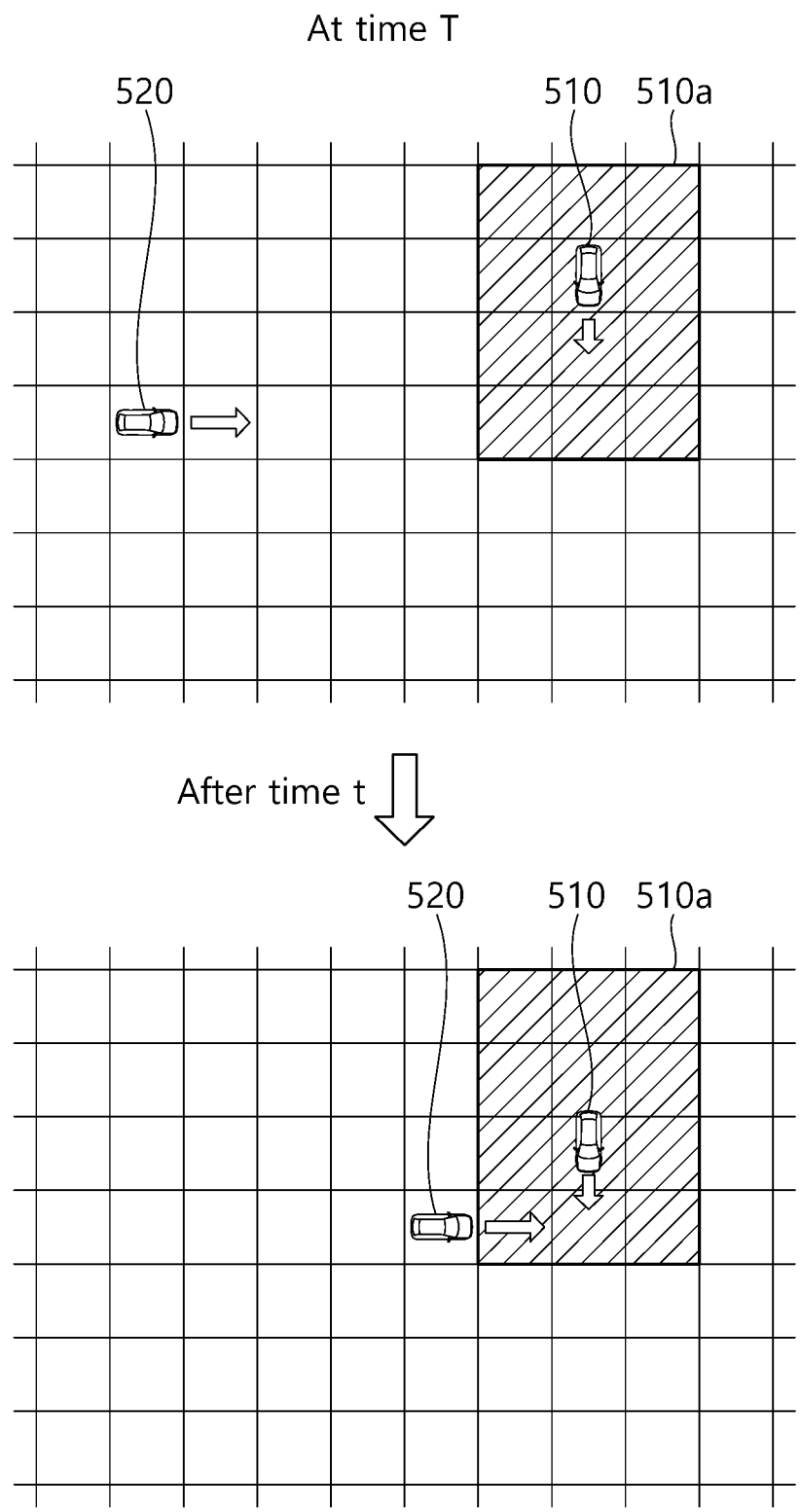
FIG. 5 shows an example of a scenario due to a neighbor V2X device according to an embodiment of the present specification.

FIG. 5 shows an example of a scenario due to a neighbor V2X device.

A first V2X device 510 sets a subscription area 510a and is running or moving at a relatively low speed. A second V2X device 520 is running or moving toward the first V2X device 510 at high speed. The V2X server is receiving V2X messages from each of the first V2X device 510 and the second V2X device 520. Also, the second V2X device 520 can also configure a subscription area.

At time "T," the second V2X device 520 is far away from the first V2X device 510 and is not located within the subscription area 510a of the first V2X device. Therefore, the V2X server does not deliver the V2X message of the second V2X device 520 to the first V2X device 510.

At time T+t, the second V2X device 520 is now adjacent to the subscription area 510a, but the V2X server still does not deliver the V2X message of the second V2X device 520 to the first V2X device 510, since second V2X device 520 is outside of the first V2X device's subscription area.

The first V2X device 510 may not set the subscription area 510a large enough as the first V2X device 510 travels at a low speed. Therefore, the first V2X device 510 may not know the existence of the second V2X device 520 approaching at high speed, and it may be difficult for the first V2X device 510 to prepare for the upcoming risk of a fast approaching vehicle in advance.

Figure 6:
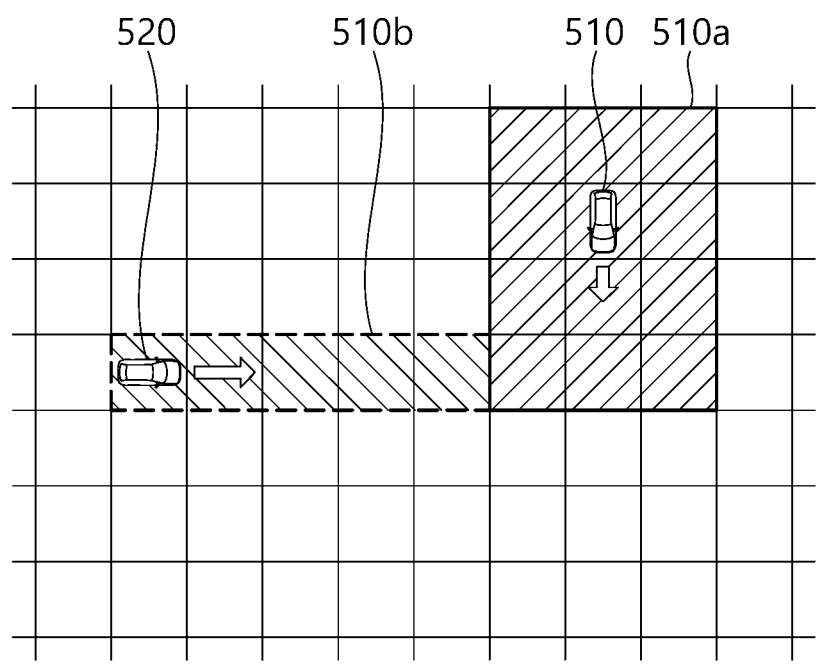
FIG. 6 shows an example of reconfiguring a subscription area according to an embodiment of the present specification.

FIG. 6 shows an example of reconfiguring a subscription area.

The V2X server can know the speed/direction of the first V2X device 510 and the speed/direction of the second V2X device 520 through the received V2X messages. Accordingly, if the V2X server determines that the possibility of collision between the first V2X device 510 and the second V2X device 510 is high enough (e.g., greater than a predetermined threshold value or a probability), the V2X server can request the first V2X device 510 to configure an additional subscription area 510b.

The V2X server can know the driving information (e.g., speed/direction, etc.) of each V2X device based on the received V2X messages. Based on the driving information, the V2X server can determine the estimated risk area of each V2X device. The V2X server selects a V2X device whose subscription area does not overlap with the estimated risk area among V2X devices within the estimated risk area. The V2X server can request the selected V2X device to add/modify its subscription area. The V2X server can deliver the V2X message of the V2X device related to the estimated risk area to the selected V2X device. The selected V2X device can add/modify its subscription area according to the request of the V2X server. The selected V2X device can determine whether to add/modify the subscription area according to whether the dangerous situation satisfies a specific condition (e.g., according to a predetermined risk level set by a user, such as an acceptable risk level personal to that user as some users may want to be safer and receive many messages or a lot of information, while other users may be more comfortable with a higher level of assumed risk).

Figure 7:
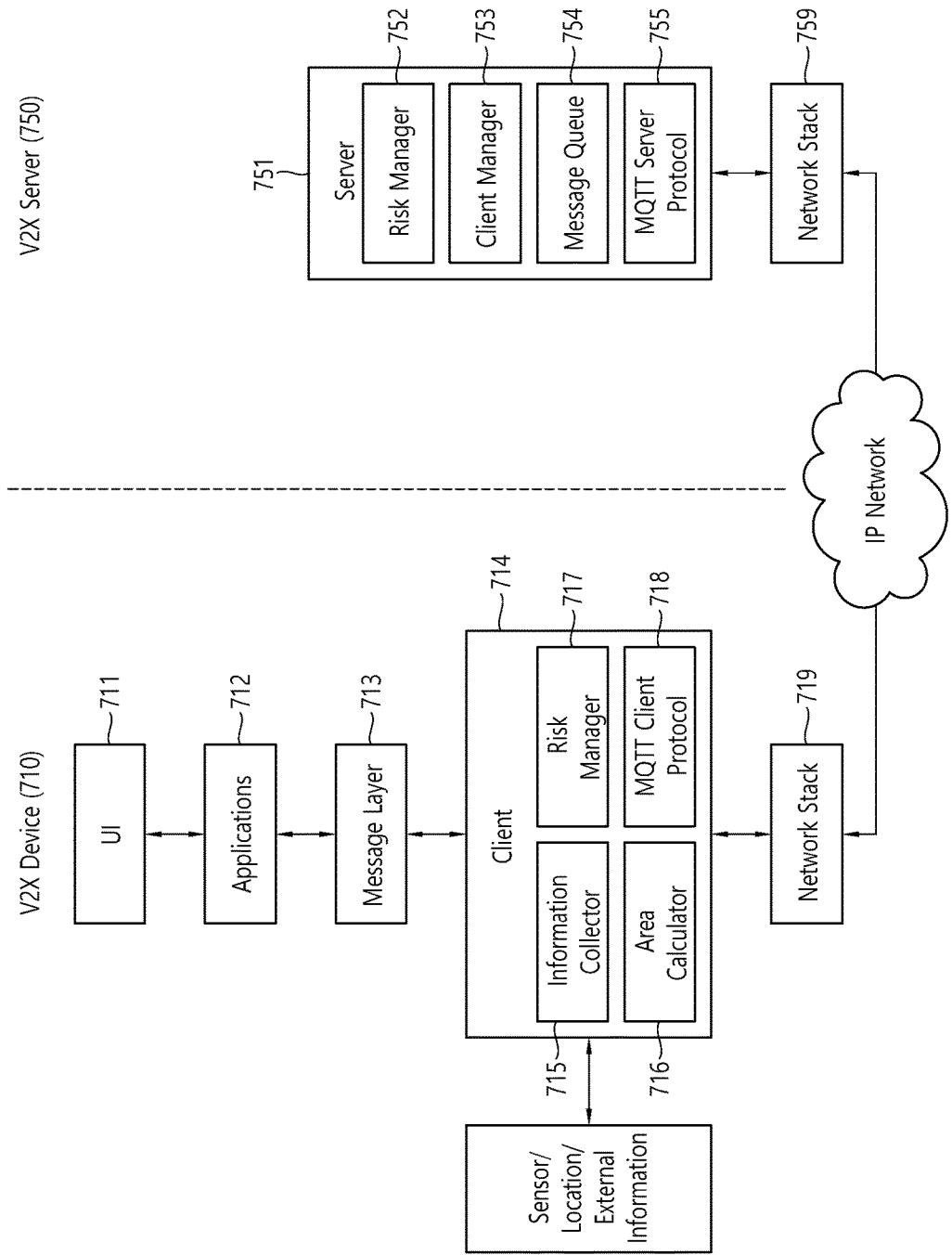
FIG. 7 shows an example of the system architecture of the V2X device and the V2X server according to an embodiment of the present specification.

FIG. 7 shows an example of the system architecture of the V2X device and the V2X server. Each module can be implemented in software, stored in a memory, and executed by a processor. Not all modules are required. Some modules can be omitted or modified, and more modules can be added. The name of each module is merely an example, not a limitation.

A V2X device 710 includes a user interface (UI) module 711, an application module 712, a message layer module 713, a client module 714, and a network stack module 718.

The UI module 711 can provide the user with a status of the V2X service, a warning, and the like, and receive a user input. The application module 712 can perform risk assessment and the like using the received message. The message layer module 713 handles the sending/receiving of messages.

The client module 714 performs a client function to support the V2X service. The client module 714 includes an information collector 715, an area calculator 716, and a Message Queuing Telemetry Transport (MQTT) client protocol 717. The information collector 715 collects the location, sensor, and/or external information of the V2X device 710. The area calculator 716 determines the subscription area. The area calculator 716 can determine whether to modify/add the subscription area according to the request of the V2X server. The area calculator 716 can determine whether to modify/add the subscription area according to the state/risk level of the V2X device 710. The MQTT client protocol 718 implements the MQTT client protocol. Also, the risk manager 717 is configured to perform a risk management function.

A V2X server 750 includes a server module 751 and a network stack module 759. The server module 751 performs a server function to support the V2X function. The server module 751 includes a client manager 752, a message queue 753, and an MQTT server protocol 754. The client manager 753 manages a client connected to the V2X server 750. The message queue 754 includes a queue for storing messages to be relayed to clients, and manages messages. The MQTT server protocol 755 implements the MQTT server protocol. Also, the risk manager 717 is configured to perform a risk management function, such evaluating potential risks between V2X devices and managing set risk levels of the V2X devices.

The network stack modules 719 and 759 implement IP network interfaces such as transmission control protocol/internet protocol (TCP/IP), user datagram protocol/internet protocol (UDP/IP), etc.

MQTT is used as a message protocol, but this is only an example. Advanced Message Queuing Protocol (AMQP), HyperText Transfer Protocol (HTTP), and/or vendor specific protocols can be used.

Figure 8:
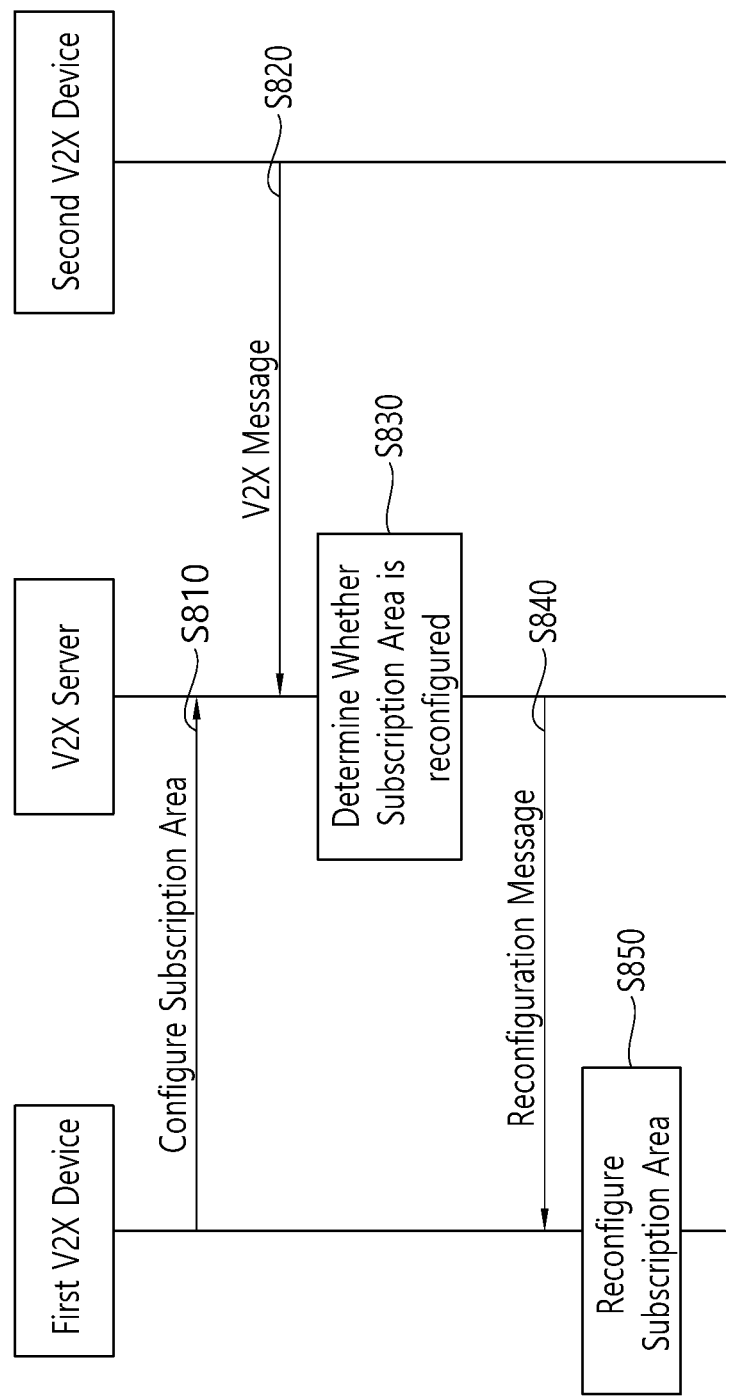
FIG. 8 is a flowchart illustrating a method for a V2X service according to another embodiment of the present specification.

FIG. 8 is a flowchart illustrating a method for a V2X service according to another embodiment of the present specification.

In step S810, a first V2X device sets a subscription area, and transmits a message including information about the subscription area to a V2X server. The subscription area can be set separately or together with the subscription request. The first V2X device can be called a subscriber device.

In step S820, a second V2X device transmits a V2X message to the V2X server. The V2X message can be arbitrarily or periodically transmitted regardless of the subscription request of the first V2X device. The V2X message can include at least one information element shown in Table 1, but there is no limitation. The V2X message can include a device ID of the second V2X device and driving information of the second V2X device. The driving information includes the location, speed/velocity, and direction of the second V2X device. The second V2X device can transmit the V2X message according to a specific condition.

Condition (1): When driving at a speed above a certain value for a specific time, the second V2X device can transmit a V2X message. Condition (2): When a sudden change in speed is detected for a specific time, the second V2X device can transmit a V2X message. Condition (3): When a sudden change in the heading direction is detected for a specific time, the second V2X device can transmit a V2X message. For example, if the second V2X device starts to change its route, direction and/or by more than a predetermined amount within a predetermined amount of time, then this can be used as a trigger for sending an update V2X message to the V2X server.

One or more of the above conditions (1) to (3) can be used. Also, one or more of the above conditions (1) to (3) can be combined. For example, it is defined as $D=w1*V+w2*A+w3*D$. V is the speed of the second V2X device, A is the speed change (acceleration) of the second V2X device, D is the direction change of the second V2X device, and w1, w2, and w3 are weights. If D is greater than a specific value, the second V2X device can transmit a V2X message to the V2X server.

In step S830, if the second V2X device is not associated with the subscription area, the V2X server determines whether the second V2X device will affect the first V2X device based on the collected V2X message, and determines whether the subscription area is needed to be reconfigured or not.

When the second V2X device is associated with the subscription area, the V2X server forwards the V2X message to the first V2X device. That the second V2X device is associated with the subscription area means that (i) the second V2X device is located in the subscription area, (ii) the publishing area of the second V2X device overlaps with the subscription area, or (iii) the subscription area of the second V2X device overlaps with the subscription area.

If the second V2X device is not associated with the subscription area, the V2X server can determine whether to reconfigure the subscription area of the first V2X device according to the degree of risk that the second V2X device affects the first V2X device. The server determines the estimated risk area of the second V2X device based on the V2X message. When the estimated risk area partially or completely overlaps the subscription area, it can be determined that the second V2X device affects the first V2X device.

The estimated risk area can be determined based on driving information of the second V2X device. The estimated risk area can include at least one or more tiles on an expected path on which the second V2X device drives or follows.

Figure 9:
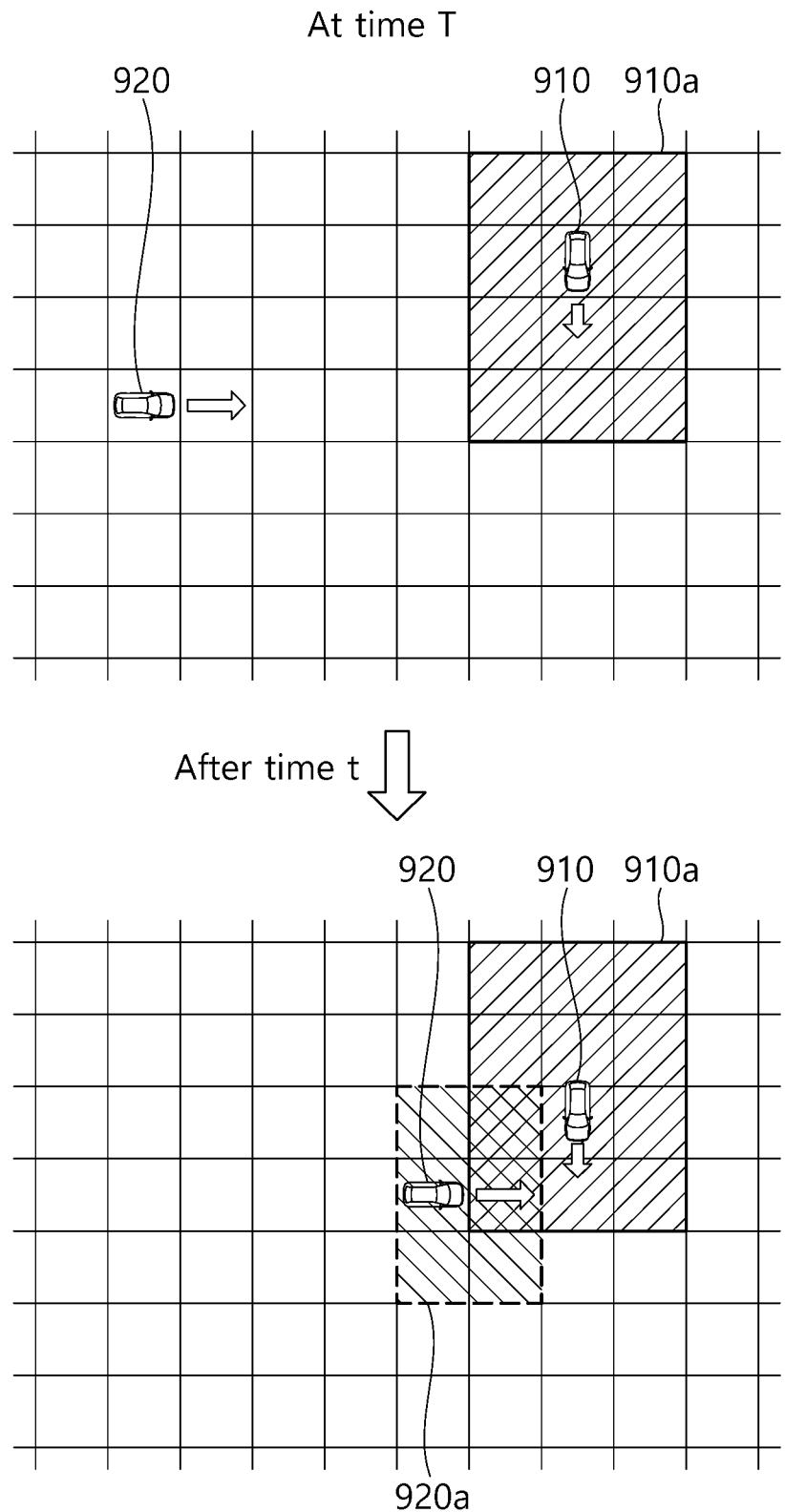
FIG. 9 shows an example of calculating an estimated risk area according to an embodiment of the present specification.

FIG. 9 shows an example of calculating an estimated risk area.

A first V2X device 910 configures a subscription area 910a. At time "T," a second V2X device 920 travels toward the first V2X device 910 at a higher speed than the first V2X device 910. At time T+t, a V2X server can calculate the estimated positions of the first V2X device 910 and the second V2X device 920 based on the speed/direction of the first V2X device 910 and the second V2X device 920. The value of "t" can be determined by the V2X server in consideration of driving information of the V2X devices. In addition, the V2X server can calculate the estimated risk area 920a in consideration of the moving direction and speed of the second V2X device 920 at time T+t. For example, the V2X server can determine the estimated risk area 920a having one or more tiles in consideration of the distance and the driving route reached by the second V2X device 920 at time T+t+k.

When a part or all of the estimated risk area 920a overlaps with the subscription area 910a, the V2X server can determine that the second V2X device 920 affects the risk of the first V2X device 910.

Referring back to FIG. 8, in step S840, if it is determined that the subscription area needs to be reconfigured (e.g. adjusted or made larger), the V2X server transmits a reconfiguration message for requesting the reconfiguration of the subscription area to the first V2X device. If it is determined that the second V2X device affects the first V2X device, the V2X server can transmit the reconfiguration message for requesting reconfiguration of the subscription area to the first V2X device.

The reconfiguration message can include information on a subscription area recommended to be reconfigured by the first V2X device. The reconfiguration message can include information on an additional area recommended to be added in the subscription area.

The reconfiguration message can include the driving information of the second V2X device. The reconfiguration message can include driving information of one or more V2X devices having one or more estimated risk areas overlapping the subscription area.

In step S850, the first V2X device can determine whether to reconfigure the subscription area based on the reconfiguration message. Reconfiguration of the subscription area can mean addition and/or modification of the subscription area. When the subscription area is reconfigured, the first V2X device can notify the reconfigured subscription area to the V2X server.

When the first V2X device receives information about the modified/added subscription area from the V2X server, the first V2X device can reconfigure the subscription area without further decision.

The first V2X device can determine whether to reconfigure the subscription area based on its own driving information and the driving information of the second V2X device. The first V2X device can predict the estimated location of the second V2X device for a specific time, and check whether the estimated location is included in the subscription area. If the estimated location is included in the subscription area, the subscription area can be reconfigured.

In the above example systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A server for vehicle-to-everything (V2X) service, the server comprising:
   a processor; and
   a memory operatively coupled with the processor and configured to store instructions that, when executed by the processor, cause the server to perform functions comprising:
   receiving, from a first V2X device, a message for configuring a subscription area of the first V2X device;
   receiving, from a second V2X device, a second V2X message, the second V2X message including a vehicle-to-everything identifier (V2X ID) identifying the second V2X device and movement information of the second V2X device including at least one of speed information and position information of the second V2X device; and
   in response to determining that the second V2X device affects the first V2X device and the second V2X device is located outside of the subscription area of the first V2X device, transmitting a reconfiguration message to the first V2X device for adjusting the subscription area of the first V2X device or adjusting the subscription area of the first V2X device.

2. The server of claim 1, wherein the determining that the second V2X device affects the first V2X device comprises:
   determining an estimated risk area based on the second V2X message; and
   determining whether the estimated risk area overlaps with the subscription area of the first V2X device.

3. The server of claim 2, wherein the functions further comprise determining that the second V2X device affects the first V2X device when the estimated risk area overlaps with the subscription area of the first V2X device.

4. The server of claim 1, wherein the functions further comprise:
   forwarding, by the sever, the second V2X message to the first V2X device when the second V2X device is located within the subscription area of the first V2X device.

5. The server of claim 1, wherein the reconfiguration message includes information on a subscription area recommended to be reconfigured by the first V2X device.

6. The server of claim 1, wherein the reconfiguration message includes the movement information of the second V2X device.

7. The server of claim 6, wherein the movement information includes a location of the second V2X device, a speed of the second V2X device and a direction of the second V2X device.

8. A method of controlling a server for providing vehicle-to-everything (V2X) service, the method comprising:
   receiving, by the server, from a first V2X device, a message for configuring a subscription area of the first V2X device;
   receiving, from a second V2X device, a second V2X message, the second V2X message including a vehicle-to-everything identifier (V2X ID) identifying the second V2X device and movement information of the second V2X device including at least one of speed information and position information of the second V2X device; and
   in response to the server determining that the second V2X device affects the first V2X device and the second V2X device is located outside of the subscription area of the first V2X device, adjusting the subscription area of the first V2X device or transmitting a reconfiguration message, from the server, to the first V2X device for adjusting the subscription area of the first V2X device.

9. The method of claim 8, wherein the determining the second V2X device affects the first V2X device comprises: determining an estimated risk area based on the second V2X message; and determining whether the estimated risk area overlaps with the subscription area of the first V2X device.

10. The method of claim 9, wherein the second V2X device affects the first V2X device when the estimated risk area overlaps with the subscription area.

11. The method of claim 8, further comprising:
   forwarding, by the server, to the first V2X device, the second V2X message when the second V2X device is located within the subscription area of the first V2X device.

12. A device for vehicle-to-everything (V2X) service, the device comprising:
   a processor, and a memory operatively coupled with the processor and configured to store instructions that, when executed by the processor, cause the device to perform functions comprising:
   transmitting, to a V2X server, a message for configuring a subscription area;
   receiving, from the V2X sever, a reconfiguration message for requesting a reconfiguration of the subscription area; and
   reconfiguring the subscription area based on the reconfiguration message.

13. The device of claim 12, wherein the reconfiguration message includes movement information of a V2X device not associated with the subscription area.

14. The device of claim 12, wherein the reconfiguration message includes information on a subscription area recommended by the V2X server to be reconfigured.

15. The server of claim 1, wherein the functions further comprise:
   in response to determining that a possibility of collision between the first V2X device and the second V2X device is greater than a predetermined value, transmitting a request to the first V2X of reconfigure the subscription area to include an additional subscription area.

16. The server of claim 15, wherein the additional subscription area is based on a speed of the second V2X device and a traveling direction of the V2X device.

17. The server of claim 1, wherein the functions further comprise: in response to determining that a possibility of collision between the first V2X device and the second V2X device is greater than a predetermined value, transmitting the second V2X message to the first V2X device.

18. The server of claim 1, wherein the functions further comprise: determining an estimated risk area in front of the second V2X device based on a speed of the second V2X device and a traveling direction of the V2X device; and in response to the estimated risk area overlapping with or being located inside of the subscription area of the first V2X device, transmitting the second V2X message to the first V2X device or transmitting a request to the first V2X of reconfigure the subscription area to include an additional subscription area.

19. The server of claim 1, wherein the functions further comprise: determining an estimated risk area in front of the second V2X device based on a speed of the second V2X device and a traveling direction of the V2X device; and in response to the estimated risk area not overlapping with the subscription area of the first V2X device, filtering the second V2X message by not transmitting the second V2X message to the first V2X device.

* * * * *